United States Patent Office 3,090,671
Patented May 21, 1963

3,090,671
METHOD OF RECOVERING SELENIUM AND/OR GERMANIUM FROM THEIR ORES
Sylvester Clingmon Buchanan, Mineral El Cubo, Guanajuato, Guanajuato, Mexico
No Drawing. Filed Feb. 6, 1959, Ser. No. 791,526
10 Claims. (Cl. 23—209)

This invention relates to a novel method for the extraction and recovery of selenium and germanium from ores, minerals, and concentrates containing these metals. More particularly, the invention concerns the recovery of selenium and germanium from these materials by cyanide extraction and precipitation from their cyanide solutions. This application is a continuation-in-part of my application Serial No. 638,914, filed February 8, 1957, now abandoned.

Both selenium and germanium are elements of constantly increasing industrial importance, but although both occur in the form of available ores and minerals which contain sufficiently large percentages to be attractive, there was in both cases, prior to the present invention, no commercially feasible and economical mode of extraction of these two metals. In each instance, reliance has had to be placed entirely on wholly artificial sources of supply, the availability of which was dependent upon operations in other industries.

Thus, in the case of selenium, the predominant portion has been produced as a by-product of the electrolytic refining of copper in conjunction with the recovery of precious metals from anode muds or slimes, in which the selenium content may range from about 3 to 8 percent, but recoveries average only about 60%. To a minor extent, selenium has been recovered from the flue dust or Cottrell precipitator mud of chamber process sulfuric acid plants by dissolving the dust in hydrochloric acid and sodium or potassium chlorate, followed by reduction with sulfur dioxide.

Germanium has been extracted from flue dusts and from coal or lignite ashes, but the chief source is the residue obtained from the recovery of cadmium from zinc ores from which the germanium is obtained by heating in presence of air and chlorine, and then hydrolyzing the chloride to germanium dioxide, and reducing to obtain the metal.

In accordance with the present invention, selenium and germanium are recovered directly from their ores, minerals, and concentrates by subjecting the material containing the selenium or germanium to comminution to a suitable particle size range and then subjecting the comminuted ore, mineral or concentrate, or mixture thereof, to an extraction treatment with an aqueous solution of an alkali metal cyanide. After separation of the cyanide solution from the insoluble ore residue, the selenium or germanium is recovered from the cyanide solution by precipitation.

The ores and minerals from which the selenium and germanium values may be recovered by our novel method include a great variety of such ores and minerals in which the selenium or germanium are associated with other elements and minerals. Thus, for example, selenium is usually found in nature in association with sulfur and with base metal sulfides, mainly the sulfides of iron, nickel, copper, silver, and to a lesser extent, of lead and mercury. Many of these selenium minerals are found in Mexico, among which there may be mentioned:

Aguilarite, a silver sulfide and selenide having a composition approximately $Ag_4SeS$;
Guanajuatite, a sulfoselenide of silver, copper, lead, bismuth, and mercury;
Naumanite, a silver selenide, $Ag_2Se$;
Eucarite, a copper-silver selenide, $Ag_2Se.CuSe$;
Claustalite, a lead selenide, $PbSe$;
Onofrite, a mercury selenide-silicide, $HgSi_2.HgSe_3$.

Aguilarite is found associated with argentite and silver at the San Carlos Mine, Guanajuato, Mexico, and it has also been reported from the Comstock Lode, Virginia City, Nevada. Some typical analyses of aguilarite are shown in Table 1:

TABLE 1

| Element | Sample numbers (percentages by weight) | | | | |
|---|---|---|---|---|---|
| | 1 | 2 | 3 | 4 | 5 |
| Se | 14.59 | 14.82 | 13.96 | 12.73 | 3.75 |
| Ag | 79.50 | 79.07 | 79.41 | 80.27 | 84.40 |
| S | 5.91 | 5.86 | 5.93 | 6.75 | 11.36 |
| Cu | | | 0.50 | 0.07 | 0.49 |
| Fe | | | | 0.26 | |
| Sb | | | | 0.41 | |
| Total | 100.00 | 99.75 | 99.80 | 100.49 | 100.00 |

Germanium is present in small amounts in many minerals, but the ores of major commercial interest include argyrodite, a silver germanium sulfide, $Ag_8GeS_6$ $$(4Ag_2S.GeS_2)$$

and also found in Mexico. Different samples exhibit germanium contents ranging from 4.99 to 7.05 percent. In the argyrodite series, tin may replace germanium to a certain extent, and a series exists including the sulfostannate, canfieldite, $Ag_8SnS_6$. Typical analyses of argyrodite are shown in Table 2:

TABLE 2

| Element | Sample numbers (percentages by weight) | | | | | |
|---|---|---|---|---|---|---|
| | 1 | 2 | 3 | 4 | 5 | 6 |
| Ge | 6.44 | 6.55 | 6.64 | 6.18 | 6.93 | 6.55 |
| Ag | 76.51 | 76.05 | 75.55 | 75.28 | 74.72 | 75.67 |
| S | 17.05 | 17.04 | 16.97 | 17.50 | 17.13 | 17.15 |
| Sn | | | | | | 0.10 |
| Fe | | 0.13 | 0.24 | | 0.66 | 3.03 |
| Zn | | 0.13 | 0.24 | | 0.22 | 0.11 |
| Balance | | 0.29 | 0.34 | 0.69 | | 0.34 |
| Total | 100.00 | 100.06 | 99.74 | 99.65 | 99.66 | 99.95 |

Another mineral which has been used commercially is germanite (Cu, Fe, Ge, Zn, Ga) (S, As), containing approximately 6 percent germanium, found in Southwest Africa.

It has been suggested in the chemical literature to treat flue dust residues from sulfuric acid manufacture with a concentrated potassium cyanide solution to form a double cyanide of potassium and selenium, and to recover the selenium from this solution by decomposition with hydrochloric acid. This method takes advantage of the well known solubility of free selenium in concentrated solutions of potassium cyanide. However, in ores and minerals, the selenium is not present in free or elementary state but is in combination and association with other metals, elements, and minerals. It was entirely unexpected and surprising to discover, in accordance with the present invention, that selenium and germanium, in the condition in which they occur in ores and minerals, were capable of being extracted by dilute cyanide solutions, and with recoveries of selenium and germanium in the neighborhood of 90 percent and higher.

In accordance with the present invention, the ore or mineral containing the selenium or germanium is first crushed or comminuted to a particle size suitable for cyanide treatment, preferably about minus ½ inch to ⅝ inch mesh size. Any suitable type of crushing apparatus may be used, as for example, gyratory crushers, jaw crushers, crushing rolls, and the like. The crushed ore or mineral is then subjected to an extraction treatment by immersion in an aqueous solution of an alkali metal cyanide. The grinding is continued while the ore or mineral is in contact with the cyanide solution in order to expose fresh material surfaces to attack by the cyanide.

The alkali metal cyanide to be used for extraction may include any soluble cyanide, such as sodium or potassium, or the cyanides of lithium, caesium or rubidium, but sodium cyanide is preferred owing to its cheapness and commercial availability. The concentration of the alkali metal cyanide solution may be varied in accordance with the type of ore or mineral being treated, but will generally be in the range of about 0.10% to 0.30%, and preferably between about 0.15% and 0.20%. The extraction temperature is not critical and extraction takes place with approximately the same efficiency at all ordinary temperatures, but in general, it is preferable to employ temperatures not lower than about 40° F.

During contact with the extracting cyanide solution, the ore or mineral particles are ground further to a fineness sufficient to attain a metal recovery in the vicinity of at least about 90%. It has been found that this degree of fineness of ore particle size is generally of the order of between minus 8 mesh size to minus 100 mesh size, with about 90% of the minus 100 mesh size material passing a 200 mesh screen.

The proportion of cyanide solution to ore or mineral, and hence the consistency of the pulp, will depend upon the type of ore being treated, and the desired rate of solution of the values being extracted, more rapid extraction being usually achieved with thinner pulps. For example, with an ore having a density of 2.5, the specific gravity of the pulp may be advantageously adjusted to about 1.25, thus corresponding to a weight ratio of solids to solution of about 1:2. It will be understood, however, that this figure is subject to increase or decrease in accordance with the type of ore or mineral being treated, extraction efficiency, and other factors.

The further grinding of the ore or mineral in contact with the cyanide solution may be carried out in any equipment suitable for wet grinding, including, for example, rod mills, ball mills, tube mills, and the like. When the desired degree of fineness of ore or mineral particles has been reached, the ore-cyanide mixture is transferred to any suitable type of sedimentation equipment, such as for example, settling tanks or thickeners, in which the proportion of ground ore to cyanide solution is adjusted to a ratio of about two parts of solution to one part of ground ore by weight. The thickened pulp is then transferred to stirring tanks in which it is continuously agitated mechanically or by means of compressed air to avoid settling of the ground ore or mineral. This agitation is continued for a period of about 24 to 72 hours, depending upon the content of selenium or germanium in the ore, stirring for the longer period being indicated when the ore contains higher values. The precise time of agitation necessary to achieve efficient extraction of the values is determined by periodic sampling to test for extraction efficiency. When the tests indicate that an economical recovery point has been achieved, the pulp is transferred to suitable sedimentation equipment, such as for example, thickeners, to separate the residue from the solution.

The clear solution comprising the thickener overflow may be further passed through sand clarifiers or canvas filters to remove any finely suspended matter. The residues are drawn from the bottom of the thickeners either by gravity or by pumping in a proportion of one part by weight of cyanide solution to one part of residue, to form a pulp, which is then filtered by any suitable type of filter, such as a rotary vacuum filter, to separate the treated residues. The solution from this filtration is combined with the thickener overflow and both subjected to any desired further clarification step.

The selenium and germanium values may be recovered from the cyanide solutions, in accordance with this invention, by precipitation of these elements from the solution. The precipitation may be accomplished either by adding to the separated solution a reagent capable of precipitating the selenium or germanium therefrom, or by means of electrolytic precipitation. The reagent capable of precipitating the metals from their cyanide solutions may be a suitable reducing agent. In the case of selenium recovery, the precipitating reagent may be a displacing metal higher in the electromotive series than selenium. The method of electrolytic precipitation is preferable for the recovery of germanium.

As displacing elements for the recovery of selenium from the cyanide solutions, there may be used any metal in the electromotive series higher than selenium, including for example, aluminum, magnesium, zinc, calcium, and iron. Thus, for example, selenium may be displaced from its cyanide solutions by the addition of zinc dust or of aluminum powder. However, the use of aluminum powder for precipitation is to be preferred since thereby no substantial loss of cyanide occurs, and the cyanide solution may be made up to working concentration and recycled back into the system. Where the cyanide solution contains both selenium and germanium, the germanium remains in solution and may be recovered by electrolysis. Gold, silver and other metal values present in the cyanide extracts are recovered together with the selenium by precipitation with aluminum or zinc.

The method of precipitation involving the use of a reducing agent is applicable to both selenium and germanium recovery. While any suitable reducing agent may be used, sulfur containing agents are especially advantageous for this purpose, such as for example, hydrogen sulfide, sodium sulfide, or sulfur dioxide. The hydrogen sulfide and sulfur dioxide may be applied in gaseous form by passing the reducing agent through the cyanide solution. The sodium sulfide may be applied in the form of an aqueous solution. When precipitating germanium from cyanide solutions, it has been found that the solution is preferably first strongly acidified with a mineral acid, such as sulfuric acid or hydrochloric acid.

The precipitated selenium or germanium are separated by filtration and dried. In the case of selenium, owing to its volatility, the drying temperature is maintained not higher than about 100° C.

Electrolytic precipitation has been found preferably in the case of germanium recovery. The electrolysis is performed in a corosion resistant tank, using lead anodes, and lead cathodes. The cathodes may be of any desired thickness, and for example, lead plates having a thickness of between ⅛ inch and ¼ inch may be used. The voltage is desirably maintained between about 3.5 to 7.5 volts, direct current, and the current density may range between about 0.50 to 1.00 ampere per square foot of electrode surface.

The following examples serve to illustrate the novel method of this invention, but are not to be regarded as limiting in any way.

*Example 1*

One ton of aguilarite ore assaying about 14.5% selenium is crushed in a roll crusher to minus ½" to ⅝" mesh size, and the ore is immersed in 2 tons of an 0.20% aqueous sodium cyanide solution. The ore is ground while in contact with the sodium cyanide solution until a degree of fineness is reached in which about 90% of material of minus 100 mesh size passes through a 200 mesh sieve. The ground ore is maintained in suspension in the cyanide solution for about 36 hours by means of air agitation, or until about 90% of the selenium is extracted, following which the suspension is transferred to a thickener for separation of solution from ore residue. The separated cyanide solution is filtered through a sand clarifier, and there are added in small lots, quantities of aluminum powder of about 200 mesh size, until precipitation of the selenium (and accompanying gold or silver, if present) is complete. The selenium is filtered off, and dried in a drying oven at about 80° C.

*Example 2*

One ton of argyrodite ore assaying about 6.5% germanium is crushed in a roll crusher to minus ½" to ⅝" mesh size and the ore is immersed in 2 tons of 0.20% solium cyanide solution. The ore is ground in contact with the cyanide solution until a degree of fineness is reached in which about 90% of the material of minus 100 mesh size passes through a 200 mesh sieve. The ground ore is transferred to tanks equipped with paddle and air agitators and maintained in suspension for a period of 36 hours, following which the mixture is pumped to a thickener and the cyanide solution separated from the ore residue. The separated cyanide solution is clarified and electrolyzed with lead anode and cathode using a voltage of about 6 volts and a current density of 1.0 ampere per square foot, until precipitation of germanium is substantially complete. The separated metal is recovered and dried.

I claim:
1. The method of recovering elements selected from the group consisting of selenium and germanium from their ores in which they are united with other elements and minerals, comprising the steps of comminuting the ore, immersing the comminuted ore in an aqueous alkali metal cyanide solution, grinding the ore while immersed in said solution to a fineness such that at least about 90% of the selenium or germanium present goes into solution, maintaining the ground ore in suspension in said solution for a period of at least 24 hours, separating the solution from the ore residue, and recovering the selenium and germanium by precipitation.

2. The method of recovering elements selected from the group consisting of selenium and germanium from their ores in which they are united with other elements and minerals, comprising the steps of comminuting the ore, immersing the comminuted ore in an aqueous sodium cyanide solution, grinding the ore while immersed in said solution to a fineness such that at least about 90% of the selenium or germanium present goes into solution, maintaining the ground ore in suspension in said solution for a period between about 24 and 72 hours, separating the solution from the ore residue, and recovering the selenium and germanium by precipitation.

3. The method of claim 1 in which the alkali metal cyanide solution has a concentration between about 1.10% and about 0.30%.

4. The method of claim 1 in which the precipitation is carried out by means of sulfur dioxide.

5. The method of claim 1 in which the precipitation is carried out by means of sodium sulfide.

6. The method of recovering selenium from its ores in which it is united with other elements and minerals, comprising the steps of comminuting the ore, immersing the comminuted ore in an aqueous alkali metal cyanide solution, grinding the ore while immersed in said solution to a fineness such that at least about 90% of the selenium present goes into solution, maintaining the ground ore in suspension in said solution for a period of at least 24 hours, separating the solution from the ore residue, and recovering the selenium by precipitation by means of a metal higher in the electromotive series than selenium.

7. The method of claim 6 in which the precipitating metal is aluminum.

8. The method of claim 6 in which the precipitating metal is zinc.

9. The method of recovering germanium from its ores in which it is united with other elements and minerals, comprising the steps of comminuting the ore, immersing the comminuted ore in an aqueous alkali metal cyanide solution, grinding the ore while immersed in said solution to a fineness such that at least 90% of the germanium present goes into solution, maintaining the ground ore in suspension in said solution for a period of at least 24 hours, separating the solution from the ore residue, and recovering the germanium by precipitation by electrolysis of the solution.

10. The method of recovering elements selected from the group consisting of selenium and germanium from their ores in which they are united with other elements and minerals, comprising the steps of comminuting said ore to a mesh size not greater than about ½ inch, immersing the comminuted ore in about 2 parts by weight of an aqueous sodium cyanide solution having a concentration between about 0.15% and about 0.20%, grinding the ore while immersed in said solution to a fineness between about 8 mesh size and about 100 mesh size, agitating the ground ore in suspension in said solution for a period between about 24 and 72 hours, separating the solution from the ore residue, and recovering the selenium and germanium by precipitation.

References Cited in the file of this patent

UNITED STATES PATENTS

| | | |
|---|---|---|
| 1,222,789 | Niemann | Apr. 17, 1917 |
| 1,226,190 | Cox et al. | May 15, 1917 |
| 1,397,684 | Hahn | Nov. 22, 1921 |
| 1,492,283 | Becket | Apr. 29, 1924 |
| 1,730,681 | Ogden et al. | Oct. 8, 1929 |
| 1,848,264 | Mitchell | Mar. 8, 1932 |

OTHER REFERENCES

Selenium—Paper read at the Society of the Chemical Industry, Nov. 20, 1908, Dr. Fred Klein.

Mellor: Comprehensive Treatise on Inorganic and Theoretical Chemistry, vol. 10, page 697.

Lunge (Sulfuric Acid and Alkali), vol. 1, part III, Gurney Jackson, 1913, pages 1469–1470.

Thorpe: Dictionary of Applied Chemistry, vol. IV, Longmans, Green & Co., 1916, pages 654–655.

Mellor: Comp. Treatise on Inorg. and Theo. Chem., vol. 10, pages 702 and 751.

Shimose: Chemical News, vol. 49, January-June 1884, pages 26–28.

Thomas et al.: "Chem. Soc. Journal," vol. 125 (1924), pages 824–826.